US011117685B2

United States Patent
Hosoda et al.

(10) Patent No.: US 11,117,685 B2
(45) Date of Patent: Sep. 14, 2021

(54) ARTIFICIAL SATELLITE AND THRUST BALANCE ADJUSTMENT METHOD

(71) Applicant: Mitsubishi Electric Corporation, Chiyoda-ku (JP)

(72) Inventors: Masaya Hosoda, Chiyoda-ku (JP); Yutaro Tanaka, Chiyoda-ku (JP); Takafumi Nakagawa, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 213 days.

(21) Appl. No.: 16/300,213

(22) PCT Filed: Jun. 28, 2016

(86) PCT No.: PCT/JP2016/069106
§ 371 (c)(1),
(2) Date: Nov. 9, 2018

(87) PCT Pub. No.: WO2018/003005
PCT Pub. Date: Jan. 4, 2018

(65) Prior Publication Data
US 2019/0144140 A1    May 16, 2019

(51) Int. Cl.
*B64G 1/24* (2006.01)
*B64G 1/26* (2006.01)
(Continued)

(52) U.S. Cl.
CPC .............. *B64G 1/242* (2013.01); *B64G 1/10* (2013.01); *B64G 1/24* (2013.01); *B64G 1/26* (2013.01);
(Continued)

(58) Field of Classification Search
CPC . B64G 1/10; B64G 1/24; B64G 1/242; B64G 1/244; B64G 1/36; B64G 1/283
See application file for complete search history.

(56) References Cited

U.S. PATENT DOCUMENTS 5,339,623 A * 8/1994 Smith ................ B64G 1/26
60/203.1
5,349,532 A * 9/1994 Tilley ................ B64G 1/26
244/164
(Continued)

FOREIGN PATENT DOCUMENTS

JP        59-50897 A      3/1984
JP        60-252100 A    12/1985
(Continued)

OTHER PUBLICATIONS

Communication pursuant to Article 94(3) dated May 4, 2020 in corresponding European Patent Application No. 16907238.6, 4 pages.
(Continued)

*Primary Examiner* — Philip J Bonzell
*Assistant Examiner* — Tye William Abell
(74) *Attorney, Agent, or Firm* — Oblon, McClelland, Maier & Neustadt, L.L.P.

(57) ABSTRACT

A reaction wheel detects an angular momentum. A satellite controller selects a target thruster based on the detected angular momentum. A power supply apparatus changes adjustment electric power for the target thruster. A flow rate adjustment apparatus supplies a propellant to the target thruster at a flow rate corresponding to the adjustment electric power. This changes a thrust of the target thruster. When a discharge current of the target thruster does not become a target current, the power supply apparatus further changes the adjustment electric power for the target thruster.

8 Claims, 17 Drawing Sheets

(51) Int. Cl.
  *B64G 1/40* (2006.01)
  *B64G 1/28* (2006.01)
  *B64G 1/10* (2006.01)
  *B64G 1/36* (2006.01)

(52) U.S. Cl.
  CPC ............... *B64G 1/283* (2013.01); *B64G 1/36* (2013.01); *B64G 1/405* (2013.01); *B64G 2001/245* (2013.01); *B64G 2700/24* (2013.01)

(56) References Cited

U.S. PATENT DOCUMENTS

| | | | | |
|---|---|---|---|---|
| 6,296,207 | B1* | 10/2001 | Tilley | B64G 1/242 |
| | | | | 244/169 |
| 8,550,405 | B2* | 10/2013 | Hruby | B64G 1/44 |
| | | | | 244/171 |
| 2011/0073714 | A1* | 3/2011 | Hruby | B64G 1/428 |
| | | | | 244/171.1 |
| 2015/0000250 | A1* | 1/2015 | Vial | F03H 1/0037 |
| | | | | 60/202 |
| 2016/0046395 | A1* | 2/2016 | Mansour | B64G 1/26 |
| | | | | 701/13 |

FOREIGN PATENT DOCUMENTS

| | | |
|---|---|---|
| JP | 62-244798 A | 10/1987 |
| JP | 2-124400 A | 5/1990 |
| JP | 2-212298 A | 8/1990 |
| JP | 6-24397 A | 2/1994 |
| JP | 6-249132 A | 9/1994 |
| JP | 2000-128096 A | 5/2000 |
| JP | 2000-211598 A | 8/2000 |
| JP | 2001-287699 A | 10/2001 |

OTHER PUBLICATIONS

Extended European Search Report dated May 15, 2019 in Patent Application No. 16907238.6, 9 pages.
International Search Report dated Sep. 13, 2016 in PCT/JP2016/069106 filed on Jun. 28, 2016.
De Tata, M. et al., "SGEO Electric Propulsion Subsystem Development Status and Future Opportunities", IEPC-2013-114, Presented at the 33rd International Electric Propulsion Conference, The George Washington University, Washington, D.C., USA, Oct. 6-10, 2013, pp. 1-11.

* cited by examiner

ARTIFICIAL SATELLITE AND THRUST BALANCE ADJUSTMENT METHOD

TECHNICAL FIELD

The present invention relates to a technology for adjusting thrust balance among a plurality of thrusters included in an artificial satellite.

BACKGROUND ART

An orbit raising operation as follows is planned.

In the orbit raising operation, a plurality of electric thrusters having a same thrust are mounted on an artificial satellite, and the plurality of electric thrusters simultaneously perform firing.

Each electric thruster ionizes xenon gas that is a propellant and accelerates the ionized xenon in a strong electric field, thereby obtaining a thrust as a reaction force.

Non-Patent Literature 1 describes about the orbit raising operation.

Even if the plurality of electric thrusters having the same thrust have been used, an angular momentum around the center of gravity of the satellite is generated if a variation occurs in thrusts generated from the respective thrusters due to an individual difference among the electric thrusters, or if distances from the center of gravity of the satellite to the respective thrusters are different.

Generally, since the difference among the thrusts of the electric thrusters and the difference among the distances from the center of gravity are small, the generated angular momentum is also small, and the generated angular momentum is absorbed by a reaction wheel. As a result, the attitude of the artificial satellite is maintained.

However, there is a limit to the angular momentum that can be accumulated in the reaction wheel. Thus, the angular momentum that is accumulated after the start of the firing will eventually reach a limit value.

In order to prevent the accumulated angular momentum from reaching the limit value, it is necessary to release the accumulated angular momentum by unloading. The orbit raising therefore must be temporarily suspended during execution of the unloading.

As a result, a time needed for the artificial satellite to be put into a geostationary orbit will increase.

CITATION LIST

Non-Patent Literature

Non-Patent Literature 1: Marco De Tata, "SGEO Electric Propulsion Subsystem Development Status and Future Opportunities", IEPC-2013-144 P1-11

SUMMARY OF INVENTION

Technical Problem

An object of the present invention is to shorten a time needed for an artificial satellite to be put into a target orbit.

Solution to Problem

An artificial satellite of the present invention may include:
a plurality of thrusters;
an angular momentum detection apparatus to detect an angular momentum that is generated in the artificial satellite; and
a satellite controller to perform adjustment control of selecting, from the plurality of thrusters, a target thruster whose thrust is to be adjusted, based on the detected angular momentum, and adjusting the thrust of the target thruster.

Advantageous Effects of Invention

According to the present invention, it becomes possible to adjust balance among thrusts of the plurality of thrusters included in the artificial satellite.

This prevents a large angular momentum from being accumulated in a reaction wheel, reduces the frequency of unloading, and reduces a period during which orbit raising cannot be performed.

As a result, it becomes possible to shorten a time needed for the artificial satellite to be put into a target orbit.

DESCRIPTION OF EMBODIMENTS

Figure 1:
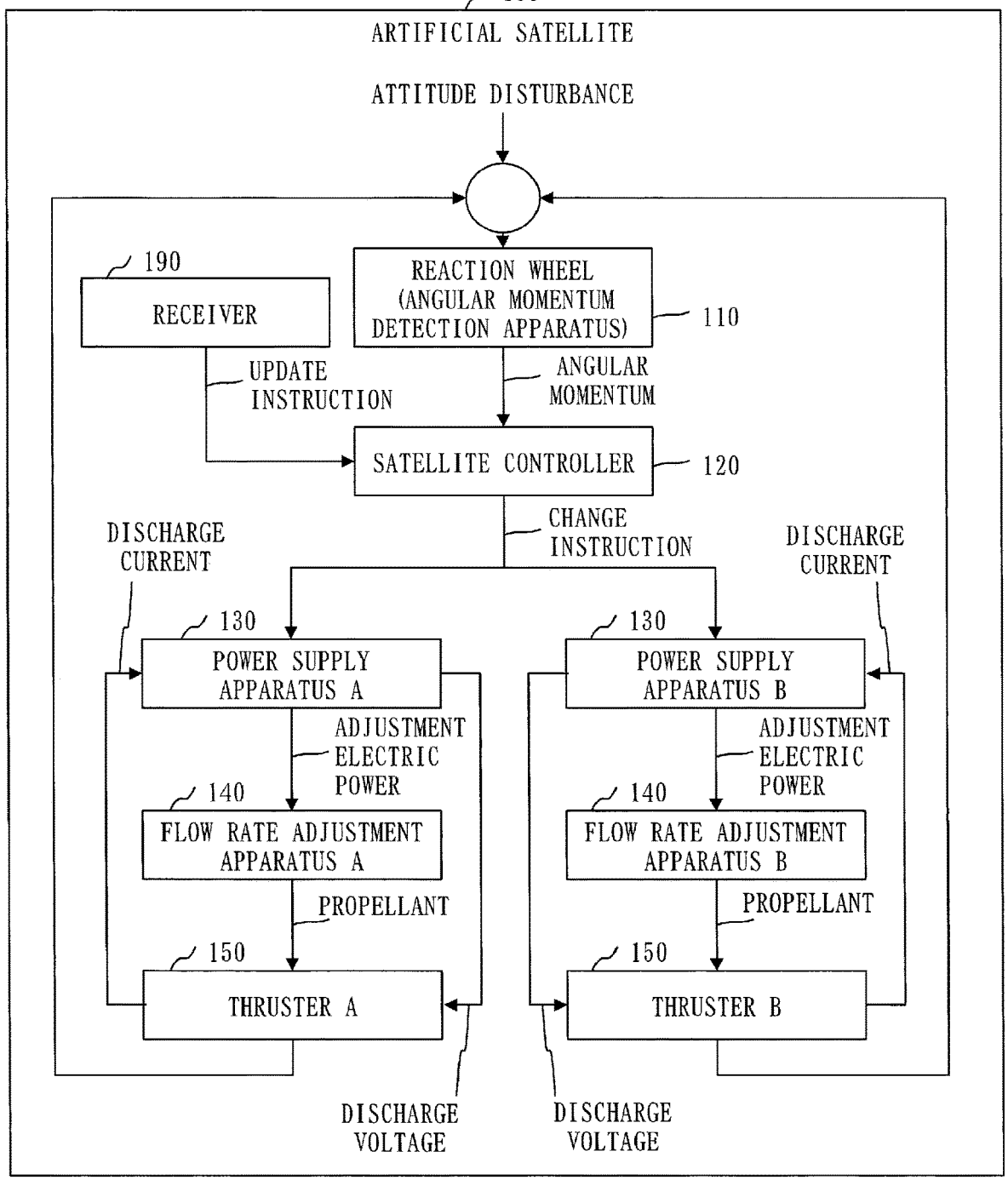
FIG. 1 is a configuration diagram of an artificial satellite 100 in a first embodiment.

A same reference numeral is given to components that are the same or corresponding to each other in embodiments and drawings. Description of the components to which the same reference numeral is given will be suitably omitted or simplified.

First Embodiment

Based on FIGS. 1 to 10, a description will be given about an embodiment where balance among thrusts of a plurality of thrusters included in an artificial satellite is adjusted.

\*\*\*Description of Configuration\*\*\*

A configuration of an artificial satellite 100 will be described based on FIG. 1. The artificial satellite 100 includes a reaction wheel 110, a satellite controller 120, a plurality of power supply apparatuses, a plurality of flow rate adjustment apparatuses, a plurality of thrusters, and a receiver 190.

The artificial satellite 100 includes a power supply apparatus A and a power supply apparatus B, as the plurality of power supply apparatuses. The power supply apparatus A and the power supply apparatus B are collectively referred to as power supply apparatuses 130.

The artificial satellite 100 includes a flow rate adjustment apparatus A and a flow rate adjustment apparatus B, as the plurality of flow rate adjustment apparatuses. The flow rate adjustment apparatus A and the flow rate adjustment apparatus B are collectively referred to as flow rate adjustment apparatuses 140.

The artificial satellite 100 includes a thruster A and a thruster B, as the plurality of thrusters. The thruster A and the thruster B are collectively referred to as thrusters 150.

Each of a set of the power supply apparatus A, the flow rate adjustment apparatus A, and the thruster A and a set of the power supply apparatus B, the flow rate adjustment apparatus B, and the thruster B constitutes an electric thruster.

The reaction wheel 110 is also referred to an RWA (Reaction Wheel Assembly).

The reaction wheel 110 detects an angular momentum that is generated in the artificial satellite 100 and absorbs the detected angular momentum.

In the first embodiment, the reaction wheel 110 is used as an angular momentum detection apparatus to detect the angular momentum that is generated in the artificial satellite 100.

An abbreviation for the satellite controller 120 is an SCU (Satellite Control Unit).

The satellite controller 120 performs adjustment control for adjusting the balance among the thrusts of the plurality of thrusters 150.

Each power supply apparatus 130 is also referred to as a PPU (Power Processing Unit).

The power supply apparatuses 130 supply adjustment electric powers to adjust flow rates of a propellant that flows through the respective plurality of thrusters 150 and detect discharge currents that flow through the respective plurality of thrusters 150. The power supply apparatuses 130 supply discharge voltages to the respective plurality of thrusters 150.

Each flow rate adjustment apparatus 140 is also referred to as an XFC (Xenon Flow Controller). The flow rate adjustment apparatus 140 referred to as the XFC adjusts a flow rate of xenon gas that is the propellant.

The flow rate adjustment apparatuses 140 adjust the flow rates of the propellant that flows through the respective plurality of thrusters 150 by the adjustment electric powers that are supplied from the power supply apparatuses 130.

Each thruster 150 is a thruster to obtain a thrust by using electric energy and is also referred to as an EPT (Electric Propulsion Thruster).

The thrust of each thruster 150 changes according to a discharge current that flows through the thruster 150 and a discharge voltage that is supplied to the thruster 150.

A thrust F of each thruster 150 can be expressed by the following Expression (1), using a discharge current $I_d$ and a discharge voltage $V_d$ where $m_i$ is an ion mass and e is an elementary electrical charge.

[Expression 1]

$$F \propto I_d \sqrt{\frac{2m_i V_d}{e}} \quad (1)$$

As seen from the above formula (1), the thrust of each thruster 150 is proportional to the discharge current $I_d$ and is proportional to the square root of the discharge voltage $V_d$.

A configuration with respect to the flow rate adjustment apparatuses 140 will be described based on FIG. 2.

The artificial satellite 100 further includes a tank 141 and a pressure adjustment apparatus 142. The flow rate adjustment apparatus A includes a valve A, and the flow rate adjustment apparatus B includes a valve B. The valve A and the valve B are collectively referred to as valves 143.

The tank 141, the pressure adjustment apparatus 142, the flow rate adjustment apparatuses 140, and the thrusters 150 are connected to a flow path 144.

The tank 141 stores the propellant at a high pressure.

The pressure adjustment apparatus 142 reduces the pressure of the propellant that flows through the flow path 144 from the tank 141.

Each flow rate adjustment apparatus 140 adjusts an opening degree of a valve 143, thereby adjusting the flow rate of the propellant that pass through the thruster 150.

A configuration of the satellite controller 120 will be described based on FIG. 3.

The satellite controller 120 includes a processor 121 and a memory 122.

The processor 121 executes processes of the satellite controller 120.

The memory 122 stores data that are used, generated, and input/output by the satellite controller 120.

Specifically, the memory 122 stores current characteristic data 123, current value data 124, a current change amount 125, and so on.

The current value data 124 is data indicating a discharge current value for each thruster 150.

The current change amount 125 is an amount by which the discharge current of each thruster 150 is to be changed.

The current change amount 125 is updated according to an instruction from an earth station.

Specifically, the current change amount 125 is updated as follows.

First, the earth station transmits a command signal including an update instruction to instruct the update of the current change amount 125 to the artificial satellite 100. The update instruction includes a new current change amount.

Subsequently, the receiver 190 receives the command signal including the update instruction.

Then, the satellite controller 120 updates the current change amount 125 stored in the memory 122 to the new current change amount included in the update instruction.

Figure 4:
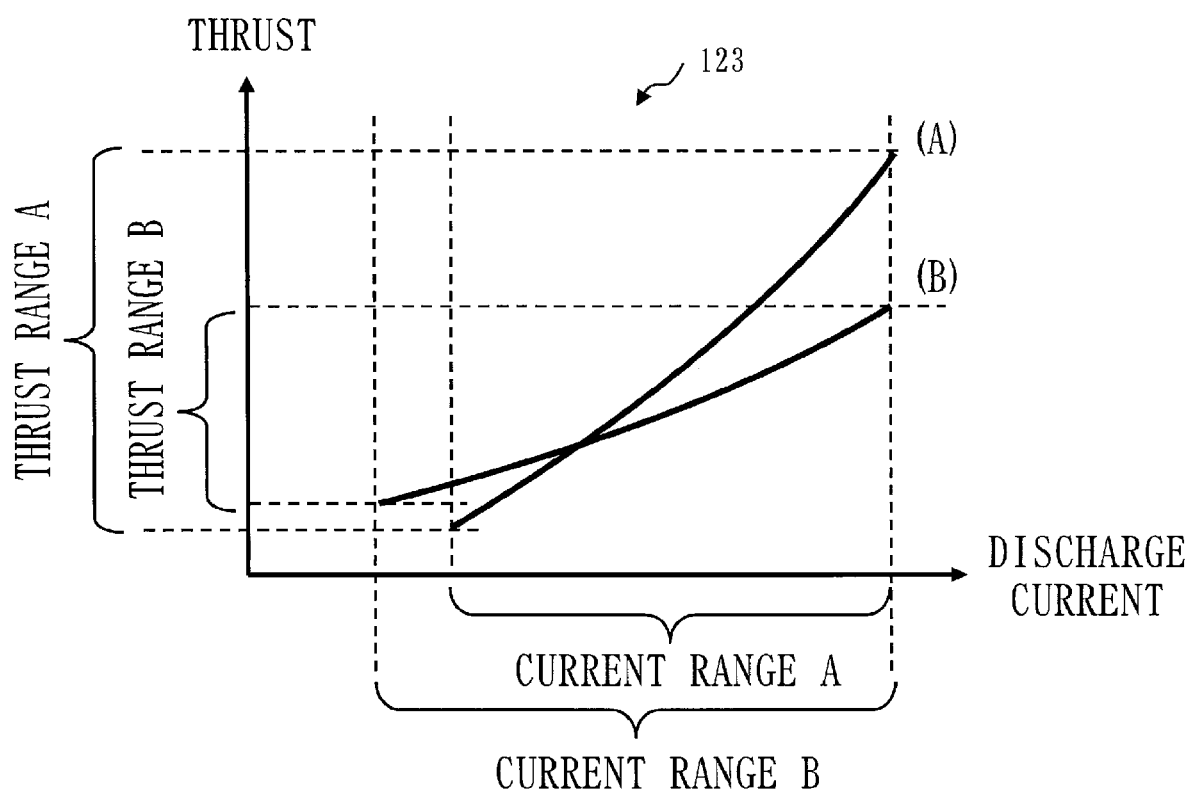
FIG. 4 includes graphs each illustrating current characteristic data 123 in the first embodiment.

The current characteristic data 123 will be described based on FIG. 4.

The current characteristic data 123 is data indicating a current characteristic for each thruster 150. The current characteristic is a range of a discharge current that can be flown through each thruster 150.

A solid line (A) indicates the current characteristic of the thruster A. A current range A is a range of the discharge current that can be flown through the thruster A. A thrust range A is a range of a thrust that the thruster A can obtain.

A solid line (B) indicates the current characteristic of the thruster B. A current range B is a range of the discharge current that can be flown through the thruster B. A thrust range B is a range of a thrust that the thruster B can obtain.

The current characteristic of each thruster 150 is obtained by a test on the earth before the artificial satellite 100 is launched.

*Description of Operations*

The artificial satellite 100 adjusts balance among thrusts of the plurality of thrusters 150 in order to restrain accumulation of an angular momentum that is generated in the artificial satellite 100.

Hereinafter, the reason for adjusting the balance among the thrusts of the plurality of thrusters 150 will be described.

Figure 5:
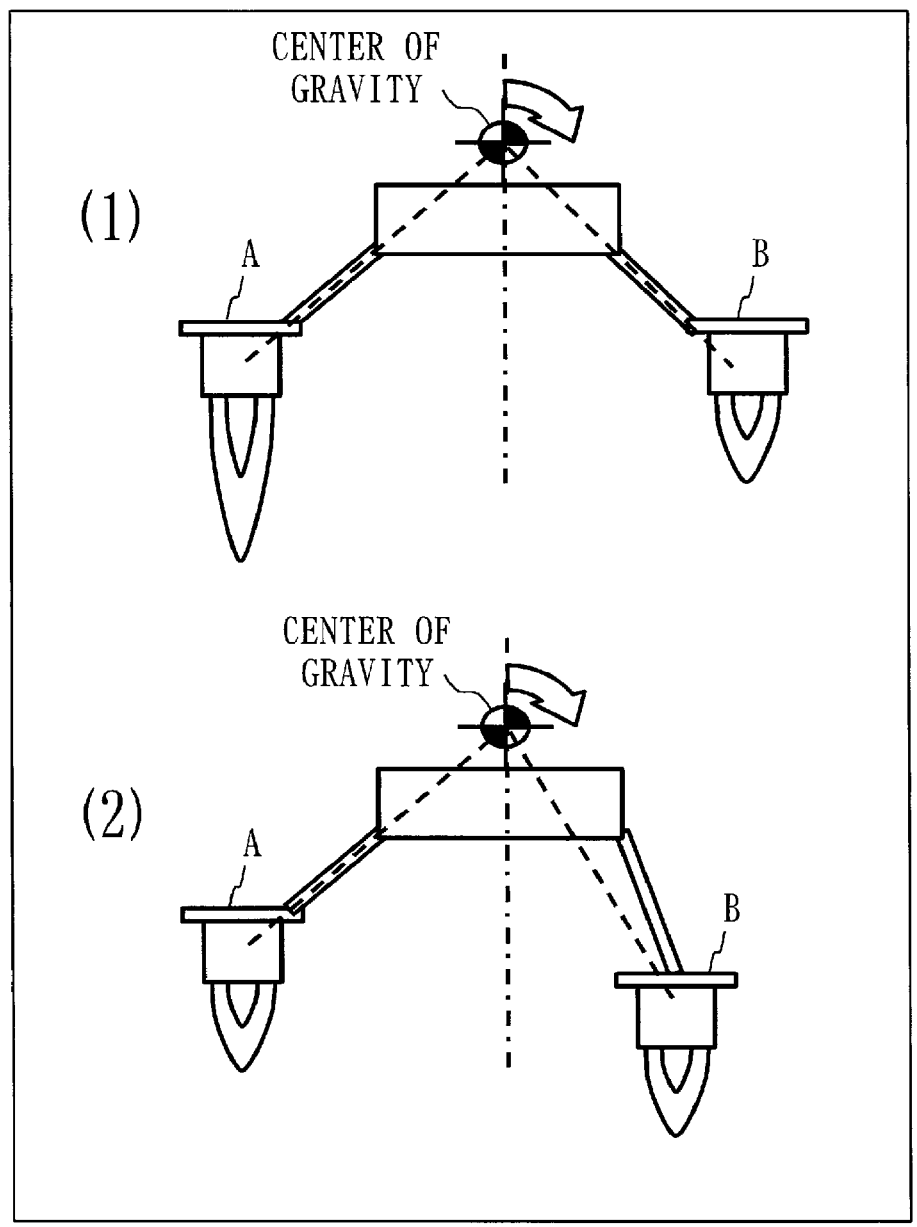
FIG. 5 includes diagrams each illustrating unbalanced thrust in the first embodiment.

Referring to FIG. 5, a distance from the center of gravity of the artificial satellite 100 to the thruster A is referred to as a distance A, while a distance from the center of gravity of the artificial satellite 100 to the thruster B is referred to as a distance B. The thrust of the thruster A is referred to as a thrust A, while the thrust of the thruster B is referred to as a thrust B.

Though the distance A and the distance B are the same to each other, the thrust A and the thrust B are different to each other, in (1) of FIG. 5. Such a thrust variation occurs due to an individual difference between the thrusters 150. In this case, a thrust that is given to the artificial satellite 100 by the thruster A and a thrust that is given to the artificial satellite 100 by the thruster B are different to each other. Thus, an angular momentum is generated around the center of gravity of the artificial satellite 100.

Though the thrust A and the thrust B are the same to each other, the distance A and the distance B are different to each other, in (2) of FIG. 5. Such a distance variation occurs by a mounting error between the thrusters 150. In this case, a thrust that is given to the artificial satellite 100 by the thruster A and a thrust that is given to the artificial satellite 100 by the thruster B are different to each other. Thus, an angular momentum is generated around the center of gravity of the artificial satellite 100.

Figure 6:
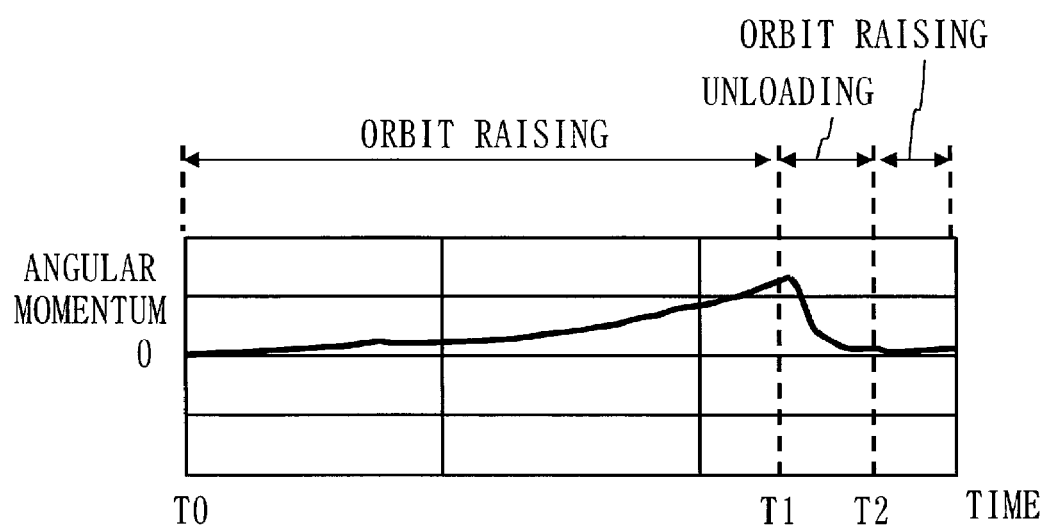
FIG. 6 is a graph illustrating an angular momentum when a thrust balance adjustment method in the first embodiment is not performed.

Based on FIG. 6, a description will be given about a case where balance among thrusts of the plurality of thrusters 150 is not adjusted.

Since an angular momentum that is generated in the artificial satellite 100 during a period from T0 to T1 is absorbed by the reaction wheel 110, the attitude of the artificial satellite 100 is maintained. Then, orbit raising is performed. On the other hand, the angular momentum is accumulated in the reaction wheel 110.

During a period from the T1 to T2, unloading is performed in order to release the angular momentum accumulated in the reaction wheel 110. While the unloading is performed, the orbit raising cannot be performed.

Since the unloading has been finished at the T2, the orbit raising is resumed.

If the balance among the thrusts of the plurality of thrusters 150 is not adjusted as mentioned above, the unloading is needed, thus producing a period during which the orbit raising cannot be performed. As a result, a time needed for putting the artificial satellite 100 into a target orbit will increase.

Based on FIGS. 7 and 8, a description will be given about a case where balance among thrusts of the plurality of thrusters 150 is adjusted.

Figure 7:
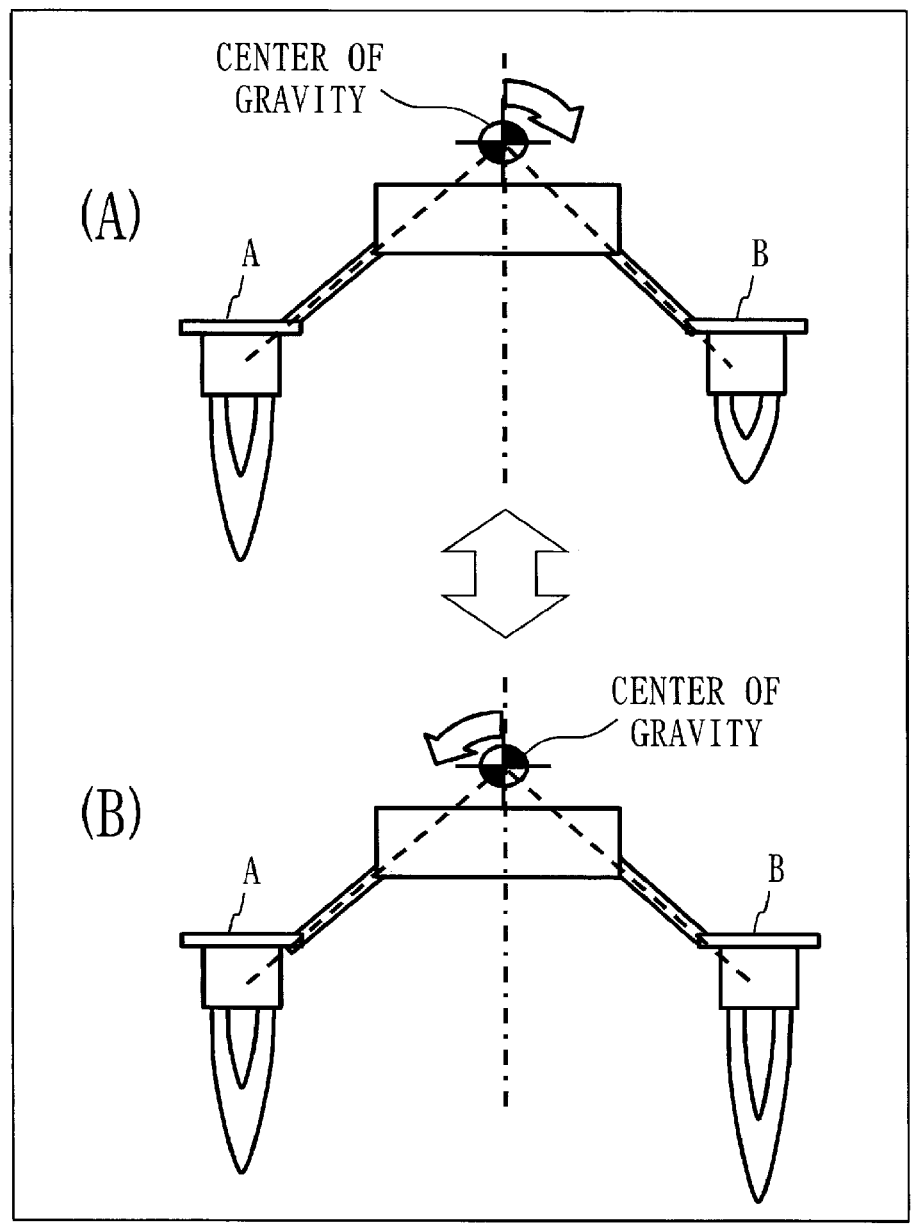
FIG. 7 is a diagram illustrating thrust balance adjustment in the first embodiment.

(A) of FIG. 7 illustrates a state where a thrust that is given to the artificial satellite 100 by the thruster A is larger than a thrust that is given to the artificial satellite 100 by the thruster B.

(B) of FIG. 7 illustrates a state where a thrust that is given to the artificial satellite 100 by the thruster B is larger than a thrust that is given to the artificial satellite 100 by the thruster A.

Figure 8:
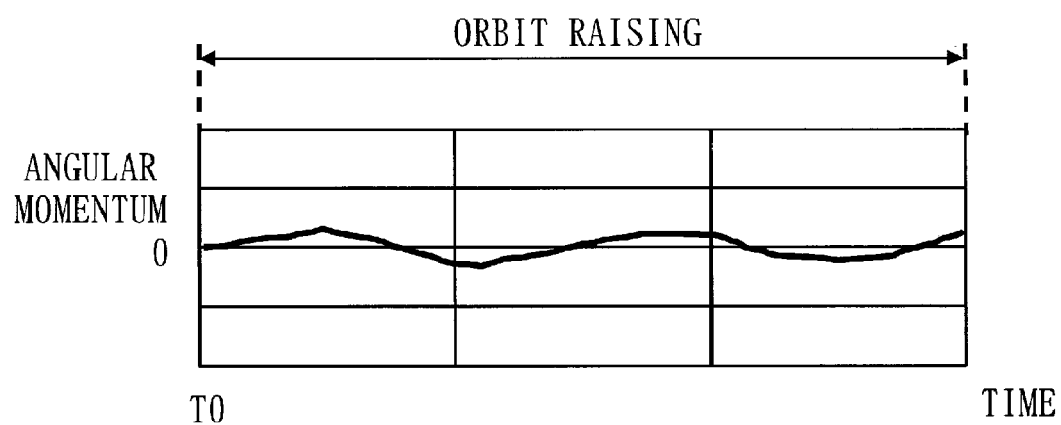
FIG. 8 is a graph illustrating an angular momentum when the thrust balance adjustment method in the first embodiment is performed.

When the balance among the thrusts of the plurality of thrusters 150 is adjusted so that the state in (A) of FIG. 7 and the state in (B) of FIG. 7 are alternated, a large angular momentum is hardly accumulated in the reaction wheel 110, as illustrated in FIG. 8. Therefore, the frequency of unloading is reduced, so that a period during which orbit raising cannot be performed is reduced. As a result, it becomes possible to shorten a time needed for putting the artificial satellite 100 into a target orbit.

Then, the artificial satellite 100 adjusts the balance among the thrusts of the plurality of thrusters 150 in order to restrain the accumulation of the angular momentum that is generated in the artificial satellite 100.

This method of the adjustment is referred to as a thrust balance adjustment method.

The thrust balance adjustment method will be described based on FIG. 9.

Step S110 is an angular momentum detection process.

In step S110, the reaction wheel 110 detects an angular momentum that is generated in the artificial satellite 100.

Then, the reaction wheel 110 outputs an angular momentum telemetry. The angular momentum telemetry is a signal indicating the detected angular momentum.

The angular momentum telemetry output from the reaction wheel 110 is input to the satellite controller 120.

Step S120 is an adjustment control process.

In step S120, the satellite controller 120 selects a target thruster from the plurality of thrusters 150, based on the angular momentum detected in S110. The target thruster is the thruster 150 whose thrust is to be adjusted.

Then, the satellite controller 120 outputs a current change instruction to the power supply apparatus 130 associated with the target thruster. The output current change instruction is input to the power supply apparatus 130 associated with the target thruster.

The current change instruction is a signal that instructs a change in a discharge current that flows through the target thruster. The current change instruction includes a target current value. The target current value is a value that is different from the discharge current of the target thruster before the current change instruction is output, just by the current change amount 125.

Details of the adjustment control process (S120) will be described later.

Step S130 is an adjustment electric power change process.

In step S130, the power supply apparatus 130 changes adjustment electric power that is supplied to the flow rate adjustment apparatus 140 associated with the target thruster. The adjustment electric power is electric power to adjust a flow rate of the propellant that flows through the target thruster.

Specifically, the power supply apparatus 130 changes the adjustment electric power, as follows.

The power supply apparatus 130 detects the discharge current that flows through the target thruster and compares the detected discharge current with a target current.

If the detected discharge current is smaller than the target current, the power supply apparatus 130 increases the adjustment electric power just by an electric power change amount. The electric power change amount is a value set in advance.

If the detected discharge current is larger than the target current, the power supply apparatus 130 reduces the adjustment electric power just by the electric power change amount.

Step S140 is a flow rate change process.

In step S140, the flow rate adjustment apparatus 140 flows the propellant through the target thruster at a flow rate corresponding to the adjustment electric power after the change.

Specifically, the flow rate adjustment apparatus 140 adjusts the opening degree of the valve 143 according to the adjustment electric power after the change.

If the adjustment electric power after the change is larger than the adjustment electric power before the change, the opening degree of the valve 143 increases, so that the flow rate of the propellant that flows through the target thruster increases.

If the adjustment electric power after the change is smaller than the adjustment electric power before the change, the opening degree of the valve 143 decreases, so that the flow rate of the propellant that flows through the target thruster decreases.

In step S150, the thrust of the target thruster changes.

Specifically, if the flow rate of the propellant that flows through the target thruster increases, the thrust of the target thruster increases. If the flow rate of the propellant that flows through the target thruster decreases, the thrust of the target thruster decreases.

Step S160 is a current detection process.

In step S160, the power supply apparatus 130 detects a discharge current that flows through the target thruster.

Step S170 is a current determination process.

In step S170, the power supply apparatus 130 compares the detected discharge current with the target current.

Then, the power supply apparatus 130 determines whether the detected discharge current has become the target current, based on a result of the comparison.

Specifically, if a difference between the detected discharge current and the target current is included in an allowable range, the power supply apparatus 130 determines that the detected discharge current has become the target current. The allowable range is a current value range set in advance.

If the detected discharge current has become the target current, the procedure proceeds to step S110.

If the detected discharge current has not become the target current, the procedure proceeds to step S130.

Figure 10:
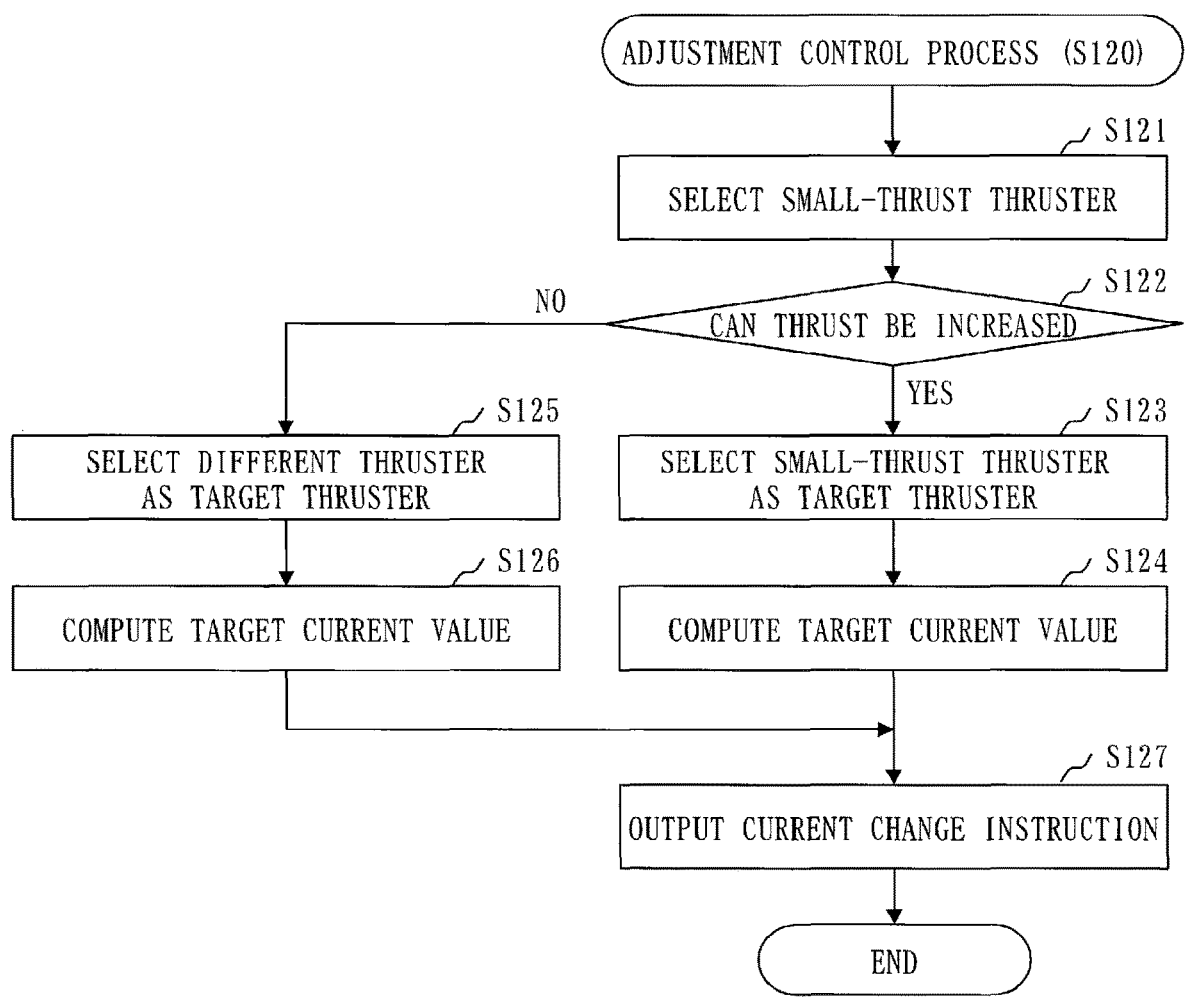
FIG. 10 is a flowchart of an adjustment control process (S120) in the first embodiment.

A procedure for the adjustment control process (S120) will be described based on FIG. 10.

In step S121, based on the angular momentum detected in step S110, the satellite controller 120 selects, among the plurality of thrusters 150, the thruster 150 whose thrust that is given to the artificial satellite 100 is smaller than a thrust of any other thruster 150. The thruster 150 that is selected is referred to a smaller-thrust thruster.

In step S122, based on the discharge current that flows through the small-thrust thruster, the satellite controller 120 determines whether the thrust of the small-thrust thruster can be increased.

Specifically, the satellite controller 120 makes the determination as follows.

First, the satellite controller 120 obtains, from the current value data 124, the value of the discharge current of the small-thrust thruster.

Then, the satellite controller 120 adds the current change amount 125 to the value of the discharge current of the small-thrust thruster. A value that is obtained by the addition is referred to a temporary current value.

Subsequently, the satellite controller 120 selects, from the current characteristic data 123, the current characteristic of the small-thrust thruster.

Then, the satellite controller 120 determines whether the temporary current value is included in a current range indicated by the current characteristic of the small-thrust thruster.

If the temporary current value is included in the current range indicated by the current characteristic of the small-thrust thruster, the thrust of the small-thrust thruster can be increased.

If the temporary current value is not included in the current range indicated by the current characteristic of the small-thrust thruster, the thrust of the small-thrust thruster cannot be increased.

If the thrust of the small-thrust thruster can be increased, the procedure proceeds to step S123.

If the thrust of the small-thrust thruster cannot be increased, the procedure proceeds to step S125.

In step S123, the satellite controller 120 selects the small-thrust thruster as the target thruster.

In step S124, the satellite controller 120 computes the target current value, using the discharge current value of the target thruster and the current change amount 125.

Then, the satellite controller 120 selects the discharge current value of the target thruster from the current value data 124 and updates the selected value to the target current value.

Specifically, the satellite controller 120 computes the target current value as follows.

The satellite controller 120 obtains, from the current value data 124, the discharge current value of the target thruster.

Then, the satellite controller 120 adds the current change amount 125 to the discharge current value of the target thruster. The value that is obtained by the addition is the target current value.

In step S125, the satellite controller 120 selects a different thruster 150 as the target thruster.

Specifically, if the small-thrust thruster is the thruster A, the thruster B is selected as the target thruster.

In step S126, the satellite controller 120 computes the target current value, using the discharge current value of the target thruster and the current change amount 125.

Then, the satellite controller 120 selects, from, the current value data 124, the discharge current value of the target thruster and updates the selected value to the target current value.

Specifically, the satellite controller 120 computes the target current value as follows.

The satellite controller 120 obtains, from the current value data 124, the discharge current value of the target thruster.

Then, the satellite controller 120 subtracts the current change amount 125 from the discharge current value of the target thruster. A value that is obtained by the subtraction is the target current value.

In step S127, the satellite controller 120 outputs the current change instruction including the target current value.

Specifically, the satellite controller 120 outputs the current change instruction as follows.

First, the satellite controller 120 generates the current change instruction including the target current value computed in step S124 or step S126.

Subsequently, the satellite controller 120 selects the power supply apparatus 130 associated with the target thruster selected in step S123 or step S125. If the target thruster is the thruster A, the power supply apparatus 130 associated with the target thruster is the power supply apparatus A. If the target thruster is the thruster B, the power supply apparatus 130 associated with the target thruster is the power supply apparatus B.

Then, the satellite controller 120 outputs the generated current change instruction to the selected power supply apparatus 130. The output current change instruction is input to the selected power supply apparatus 130.

Effects of First Embodiment

By controlling the discharge current of the target thruster, the adjustment of balance among the thrusts of the plurality of thrusters 150 becomes possible.

This prevents a large angular momentum from being accumulated in the reaction wheel 110, reduces the frequency of unloading, and reduces a period during which orbit raising cannot be performed.

As a result, it becomes possible to shorten a time needed for putting the artificial satellite 100 to be put into a target orbit.

*Alternative Configuration*

The artificial satellite 100 may include both of an electric thruster and a chemical thruster.

The number of the thrusters 150 may be three or more.

A propellant other than the xenon gas may be used.

Second Embodiment

With respect to an embodiment where balance among thrusts of a plurality of thrusters 150 is adjusted by controlling a discharge voltage of a target thruster, a difference of the embodiment from the first embodiment will be mainly described based on FIGS. 11 to 14.

*Description of Configuration*

Figure 2:
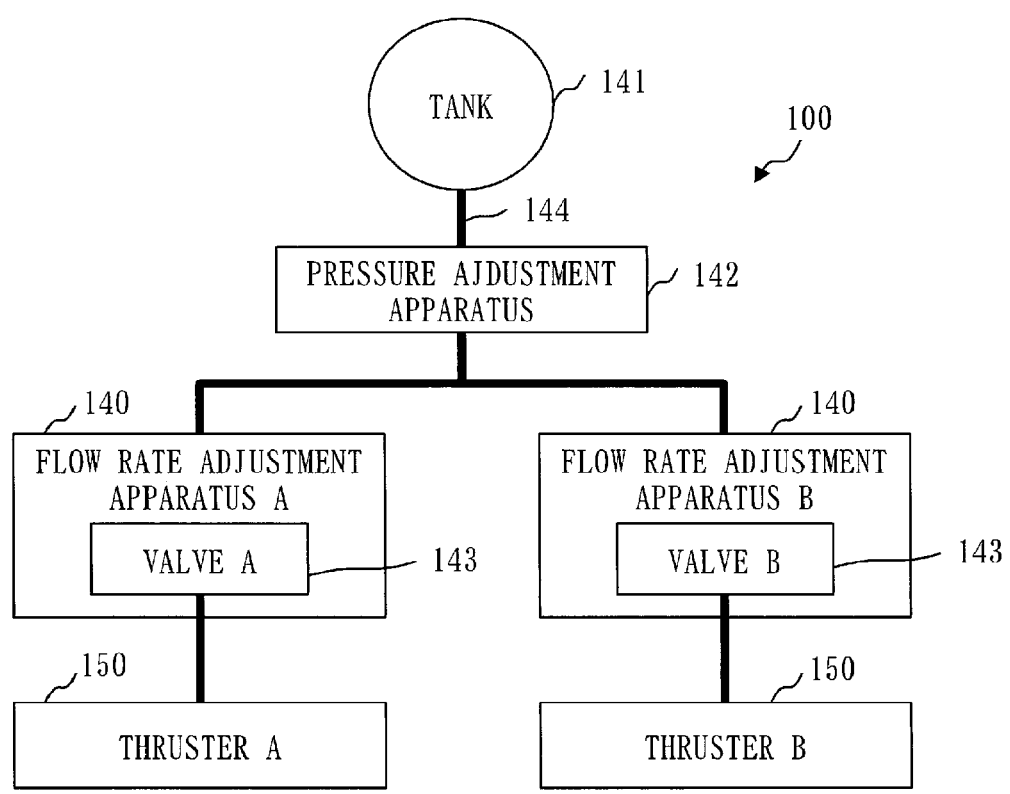
FIG. 2 is a configuration diagram with respect to flow rate adjustment apparatuses 140 in the first embodiment.

A configuration of an artificial satellite 100 is the same as that in FIGS. 1 and 2 in the first embodiment.

However, a change instruction that is output from a satellite controller 120 is not a current change instruction in the first embodiment but is a voltage change instruction. The voltage change instruction will be described later.

Figure 11:
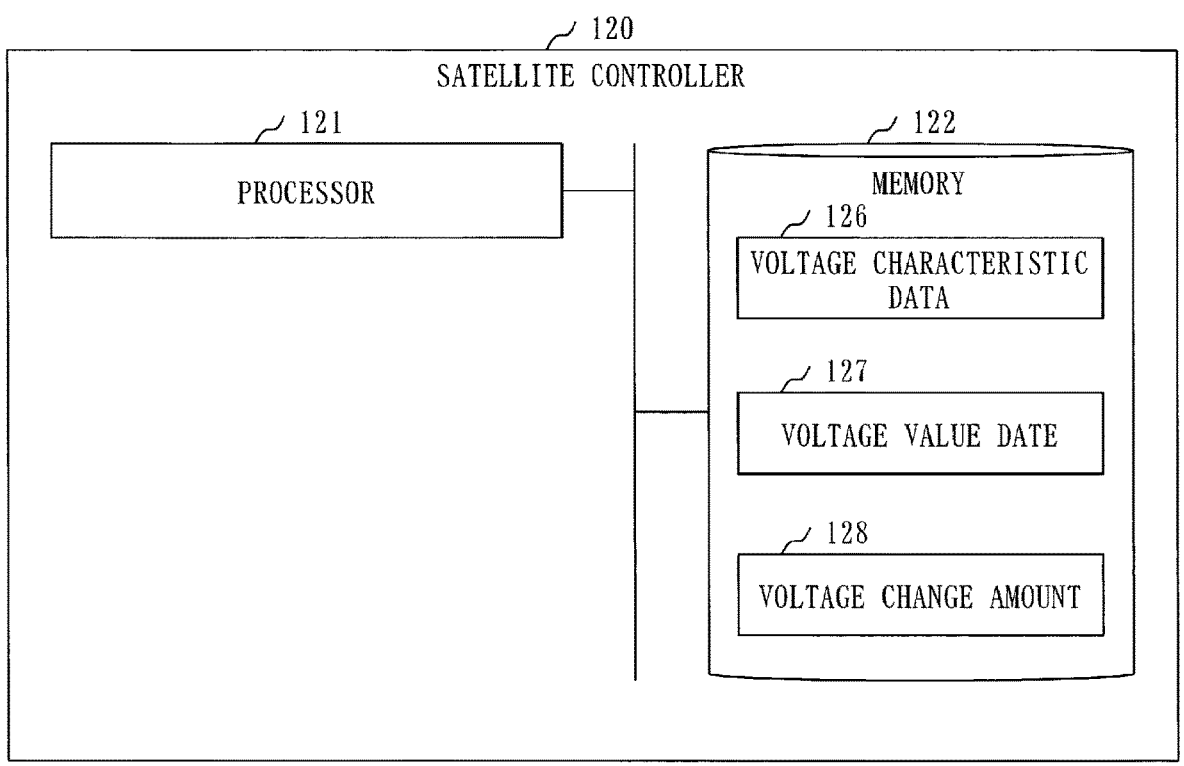
FIG. 11 is a configuration diagram of a satellite controller 120 in a second embodiment.

A configuration of the satellite controller 120 will be described based on FIG. 11.

Figure 3:
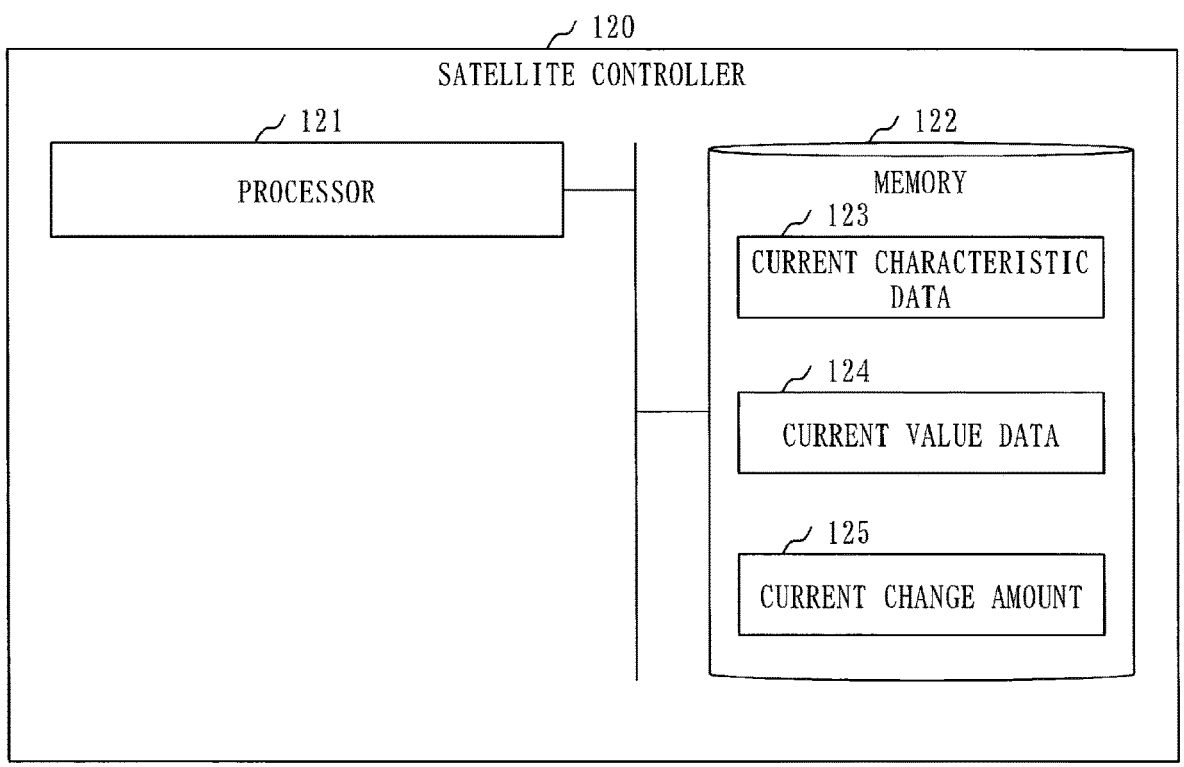
FIG. 3 is a configuration diagram of a satellite controller 120 in the first embodiment.

The satellite controller 120 includes a processor 121 and a memory 122, as in FIG. 3 in the first embodiment.

The memory 122 stores voltage characteristic data 126, voltage value data 127, and a voltage change amount 128.

The voltage value data 127 is data indicating a discharge voltage value for each thruster 150.

The voltage change amount 128 is an amount by which the discharge voltage of each thruster 150 is to be changed.

The voltage change amount 128 is updated according to an instruction from an earth station.

Specifically, the voltage change amount 128 is updated as follows.

First, the earth station transmits, to the artificial satellite 100, a command signal including an update instruction to instruct the update of the voltage change amount 128. The update instruction includes a new voltage change amount.

Subsequently, a receiver 190 receives the command signal including the update instruction.

Then, the satellite controller 120 updates the voltage change amount 128 stored in the memory 122 to the new voltage change amount included in the update instruction.

Figure 12:
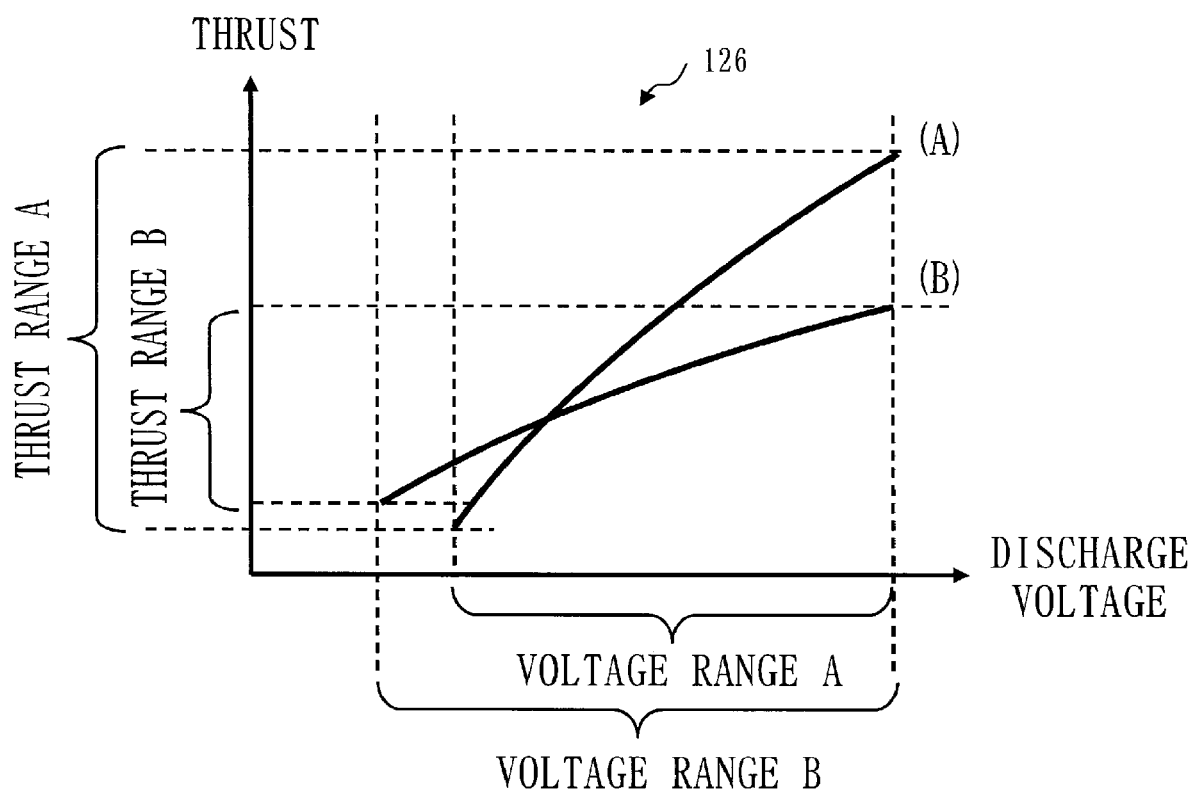
FIG. 12 includes graphs each illustrating voltage characteristic data 126 in the second embodiment.

The voltage characteristic data 126 will be described based on FIG. 12.

The voltage characteristic data 126 is data indicating a voltage characteristic for each thruster 150. The voltage characteristic is a range of a discharge voltage that can be applied to each thruster 150.

A solid line (A) indicates the voltage characteristic of a thruster A. A voltage range A is a range of the discharge voltage that can be applied to the thruster A. A thrust range A is a range of a thrust that the thruster A can obtain.

A solid line (B) indicates the voltage characteristic of a thruster B. A voltage range B is a range of the discharge voltage that can be applied to the thruster B. A thrust range B is a range of a thrust that the thruster B can obtain.

The voltage characteristic of each thruster 150 is obtained by a test on the earth before the artificial satellite 100 is launched.

*Description of Operations*

Figure 13:
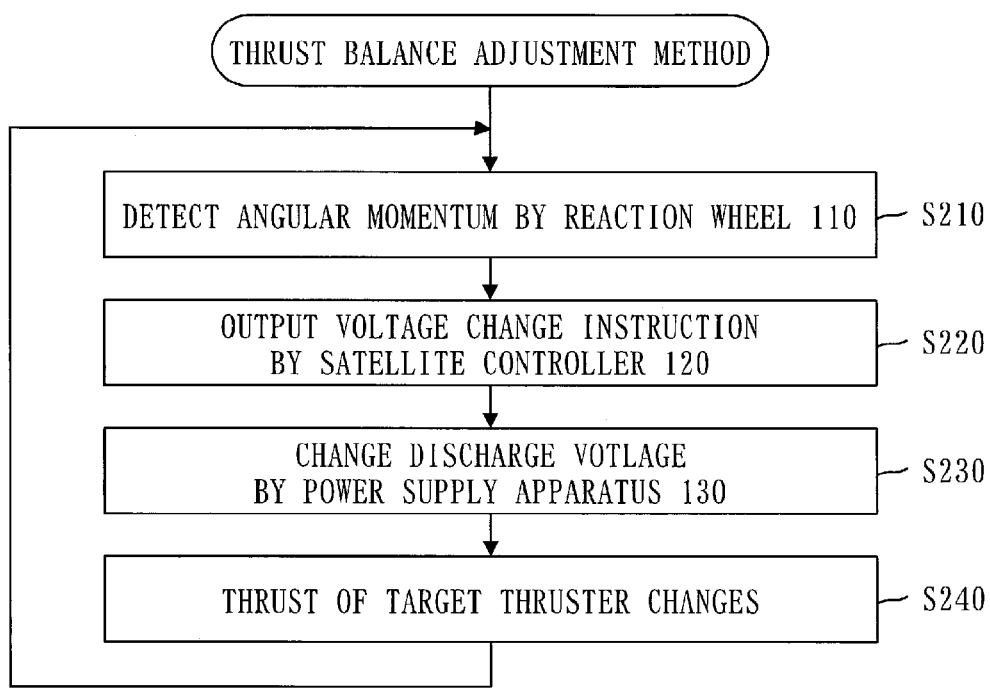
FIG. 13 is a flowchart of a thrust balance adjustment method in the second embodiment.

A thrust balance adjustment method will be described based on FIG. 13.

Figure 9:
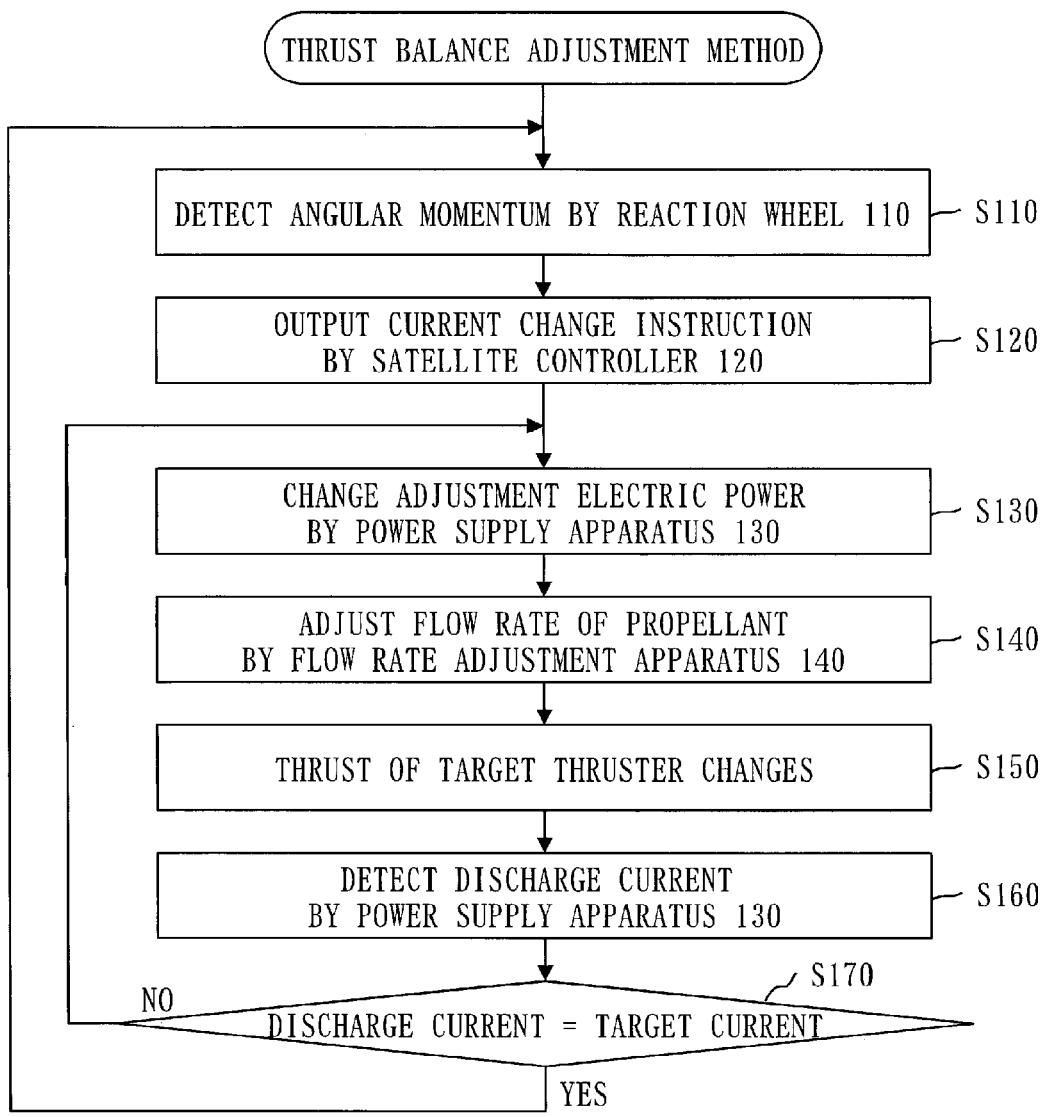
FIG. 9 is a flowchart of the thrust balance adjustment method in the first embodiment.

Step S210 is the same as step S110 in FIG. 9 in the first embodiment.

In step S210, a reaction wheel 110 detects an angular momentum that is generated in the artificial satellite 100.

Step S220 is an adjustment control process.

In step S220, the satellite controller 120 selects, from the plurality of thrusters 150, a target thruster, based on the angular momentum detected in step S210.

Then, the satellite controller 120 outputs a voltage change instruction to a power supply apparatus 130 associated with the target thruster. The output voltage change instruction is input to the power supply apparatus 130 associated with the target thruster.

The voltage change instruction is a signal that instructs a change in a discharge voltage that is supplied to the target thruster. The voltage change instruction includes a target voltage value. The target voltage value is a value different from the discharge voltage of the target thruster before the voltage change instruction is output, just by the voltage change amount 128.

Details of the adjustment control process (S220) will be described later.

Step S230 is a discharge voltage change process.

In step S230, the power supply apparatus 130 changes the discharge voltage that is supplied to the target thruster to a target voltage. In other words, the power supply apparatus 130 supplies the target voltage to the target thruster.

In step S240, the thrust of the target thruster changes.

Specifically, the thrust of the target thruster increases as the discharge voltage that is supplied to the target thruster becomes high. The thrust of the target thruster decreases as the discharge voltage that is supplied to the target thruster becomes low.

After step S240, the procedure proceeds to step S210.

Figure 14:
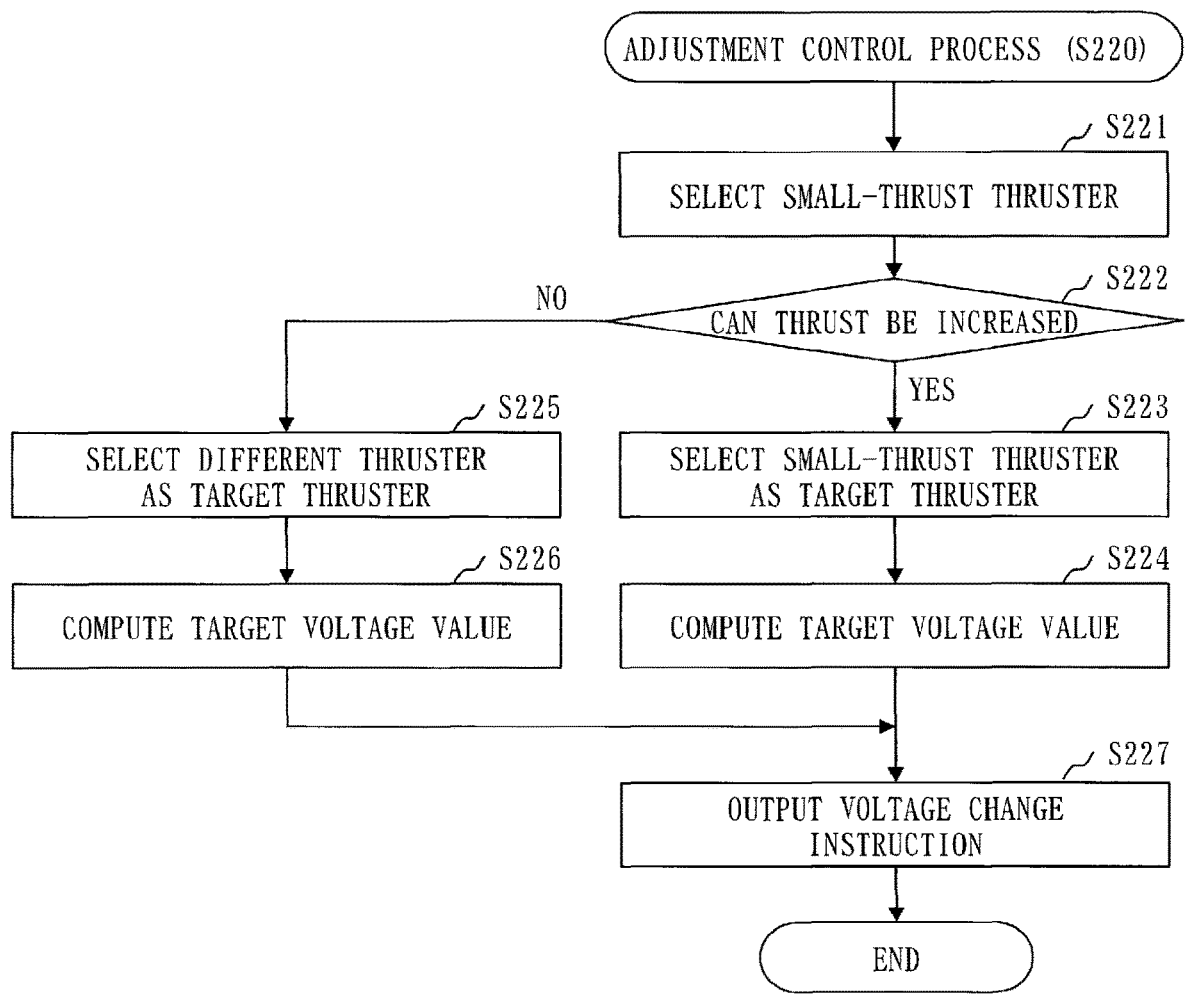
FIG. 14 is a flowchart of an adjustment control process (S220) in the second embodiment.

A procedure for the adjustment control process (S220) will be described based on FIG. 14.

In step S221, based on the angular momentum detected in step S210, the satellite controller 120 selects, among the plurality of thrusters 150, the thruster 150 whose thrust that is given to the artificial satellite 100 is smaller than a thrust of any other thruster 150. The thruster 150 that is selected is referred to as a small-thrust thruster.

In step S222, based on the discharge voltage that flows through the small-thrust thruster, the satellite controller 120 determines whether the thrust of the small-thrust thruster can be increased.

Specifically, the satellite controller 120 makes the determination as follows.

First, the satellite controller 120 obtains, from the voltage value data 127, the value of the discharge voltage of the small-thrust thruster.

Then, the satellite controller 120 adds the voltage change amount 128 to the value of the discharge voltage of the small-thrust thruster. A value that is obtained by the addition is referred to a temporary voltage value.

Subsequently, the satellite controller 120 selects, from the voltage characteristic data 126, the voltage characteristic of the small-thrust thruster.

Then, the satellite controller 120 determines whether the temporary voltage value is included in a voltage range indicated by the voltage characteristic of the small-thrust thruster.

If the temporary voltage value is included in the voltage range indicated by the voltage characteristic of the small-thrust thruster, the thrust of the small-thrust thruster can be increased.

If the temporary voltage value is not included in the voltage range indicated by the voltage characteristic of the small-thrust thruster, the thrust of the small-thrust thruster cannot be increased.

If the thrust of the small-thrust thruster can be increased, the procedure proceeds to step S223.

If the thrust of the small-thrust thruster cannot be increased, the procedure proceeds to step S225.

In step S223, the satellite controller 120 selects the small-thrust thruster as the target thruster.

In step S224, the satellite controller 120 computes the target voltage value, using the discharge voltage value of the target thruster and the voltage change amount 128.

Then, the satellite controller 120 selects the discharge voltage value of the target thruster from the voltage value data 127 and updates the selected value to the target voltage value.

Specifically, the satellite controller 120 computes the target voltage value as follows.

The satellite controller 120 obtains, from the voltage value data 127, the discharge voltage value of the target thruster.

Then, the satellite controller 120 adds the voltage change amount 128 to the discharge voltage value of the target thruster. A value that is obtained by the addition is the target voltage value.

In step S225, the satellite controller 120 selects a different thruster 150 as the target thruster.

Specifically, if the small-thrust thruster is the thruster A, the thruster B is selected as the target thruster.

In step S226, the satellite controller 120 computes the target voltage value, using the discharge voltage value of the target thruster and the voltage change amount 128.

Then, the satellite controller 120 selects, from the voltage value data 127, the discharge voltage value of the target thruster and updates the selected value to the target voltage value.

Specifically, the satellite controller 120 computes the target voltage value as follows.

The satellite controller 120 obtains, from the voltage value data 127, the discharge voltage value of the target thruster.

Then, the satellite controller 120 subtracts the voltage change amount 128 from the discharge voltage value of the target thruster. A value that is obtained by the subtraction is the target voltage value.

In step S227, the satellite controller 120 outputs the voltage change instruction including the target voltage value.

Specifically, the satellite controller 120 outputs the voltage change instruction as follows.

First, the satellite controller 120 generates the voltage change instruction including the target voltage value computed in step S224 or step S226.

Subsequently, the satellite controller 120 selects the power supply apparatus 130 associated with the target thruster selected in step S223 or step S225. If the target thruster is the thruster A, the power supply apparatus 130 associated with the target thruster is a power supply apparatus A. If the target thruster is the thruster B, the power supply apparatus 130 associated with the target thruster is a power supply apparatus B.

Then, the satellite controller 120 outputs the generated voltage change instruction to the selected power supply apparatus 130. The output current change instruction is input to the selected power supply apparatus 130.

Effects of Second Embodiment

By controlling the discharge voltage of the target thruster, the adjustment of the balance among the thrusts of the plurality of thrusters 150 becomes possible.

As a result, it becomes possible to shorten a time needed for putting the artificial satellite 100 to be put into a target orbit, as in the first embodiment.

Third Embodiment

Figure 15:
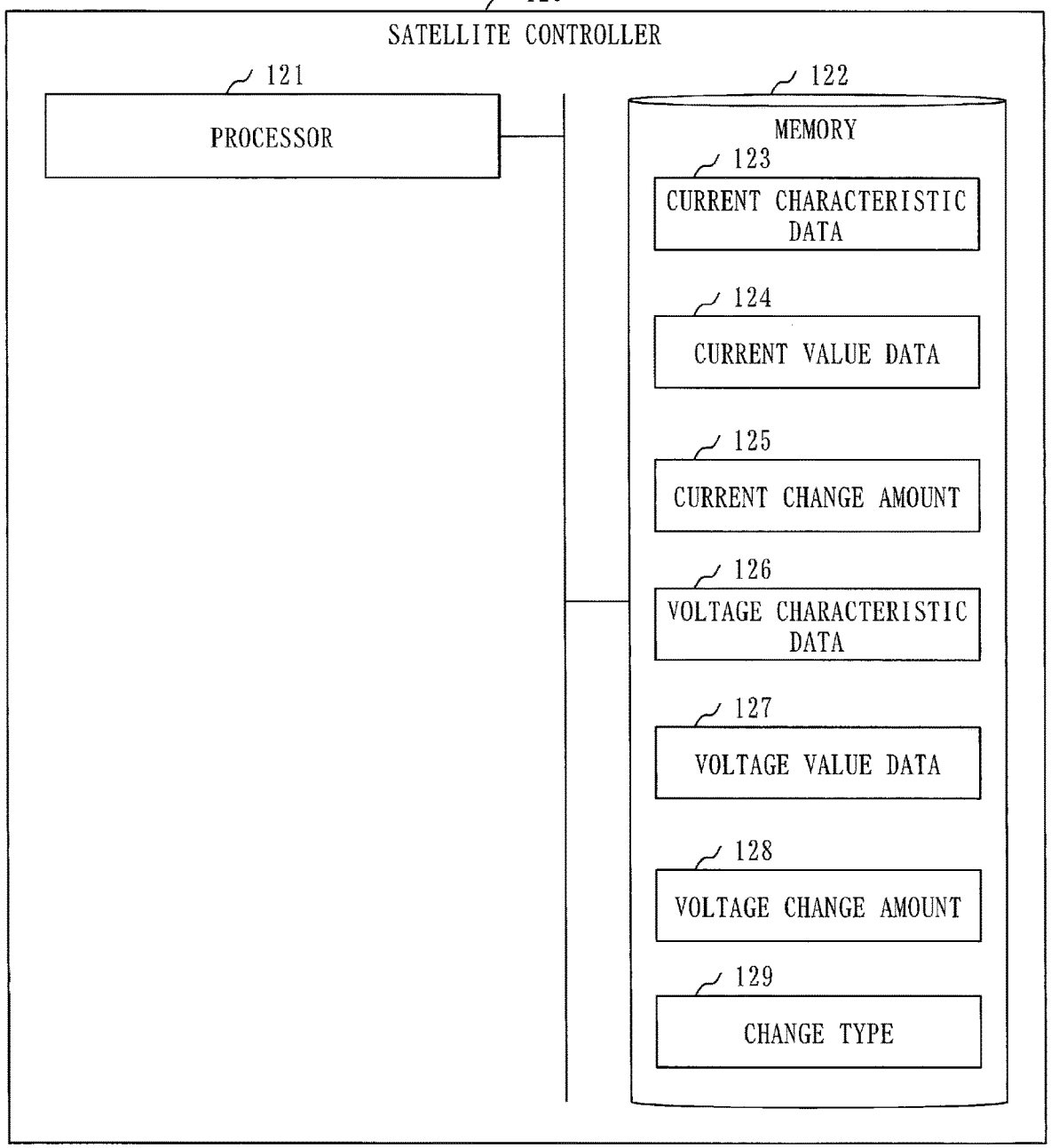
FIG. 15 is a configuration diagram of a satellite controller 120 in a third embodiment.

With respect to an embodiment where balance among thrusts of a plurality of thrusters 150 is adjusted by controlling a discharge current of a target thruster or a discharge voltage of the target thruster, a difference of the embodiment from the first embodiment and the second embodiment will be described based on FIGS. 15 to 17.

*Description of Configuration*

A configuration of an artificial satellite 100 is the same as that in FIGS. 1 and 2 in the first embodiment.

A change instruction that is output from a satellite controller 120 is a current change instruction in the first embodiment or a voltage change instruction in the second embodiment.

A configuration of the satellite controller 120 will be described based on FIG. 15.

The satellite controller 120 includes a processor 121 and a memory 122, as in FIG. 3 in the first embodiment.

The memory 122 stores current characteristic data 123, current value data 124, a current change amount 125, voltage characteristic data 126, voltage value data 127, a voltage change amount 128, and a change type 129.

The change type 129 indicates one of a current change and a voltage change.

The change type 129 is updated according to an instruction from an earth station.

Specifically, the change type 129 is updated as follows.

First, the earth station transmits, to the artificial satellite 100, a command signal including a type instruction to instruct one of change types of the current change and the voltage change.

Subsequently, a receiver 190 receives the command signal including the type instruction.

Then, the satellite controller 120 updates the change type 129 stored in the memory 122 to the change type instructed by the type instruction.

\*\*\*Description of Operations\*\*\*

A thrust balance adjustment method will be described based on FIGS. 16 and 17.

Figure 16:
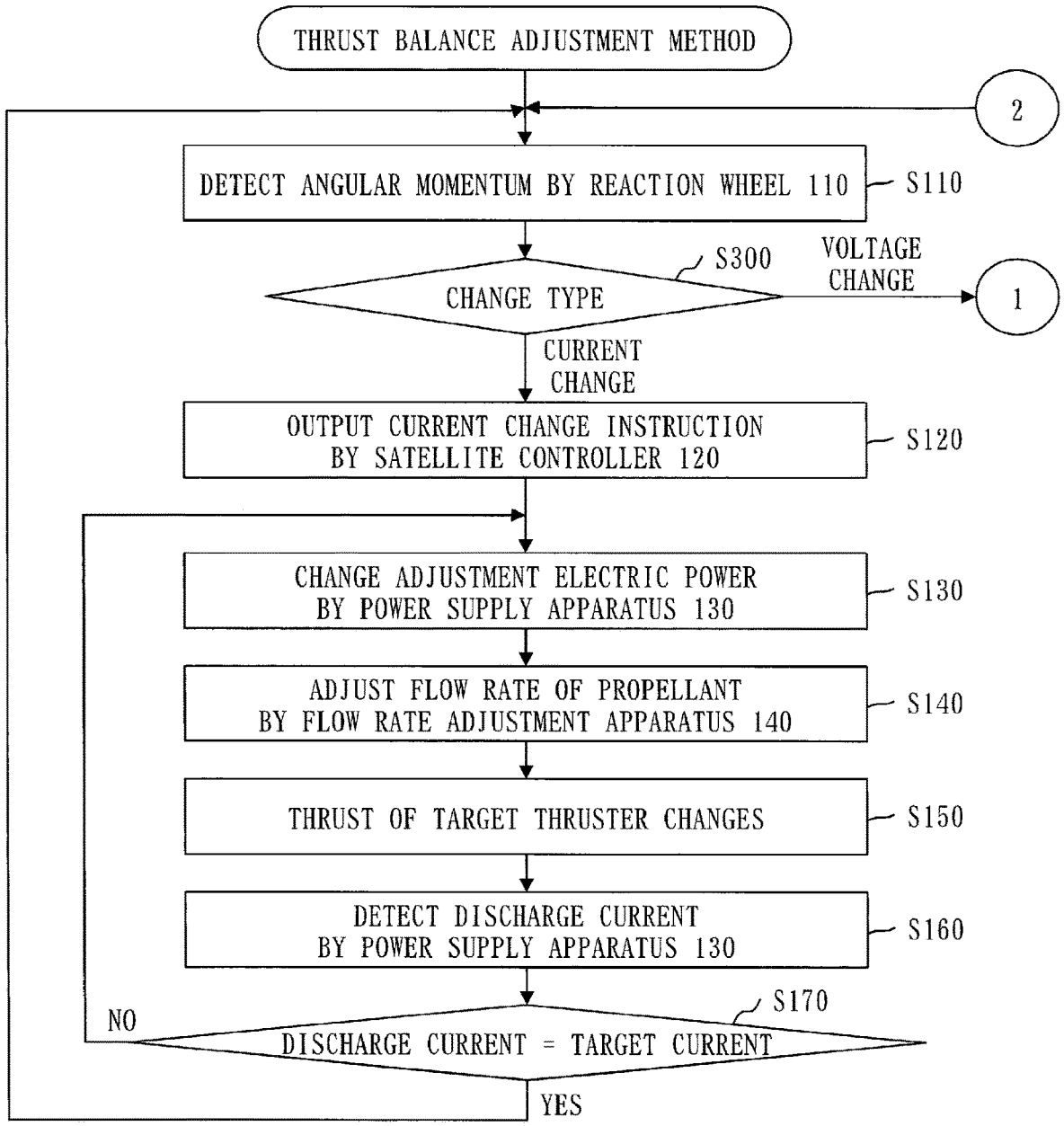
FIG. 16 is a flowchart of a thrust balance adjustment method in the third embodiment.

Step S110 in FIG. 16 is the same as that in FIG. 9 in the first embodiment.

Step S300 is a type determination process.

In step S300, the satellite controller 120 determines which one of the current change and the voltage change the change type 129 is.

If the change type 129 is the current change, the procedure proceeds to step S120. Processes after step S120 are the same as those in FIG. 9 in the first embodiment.

Figure 17:
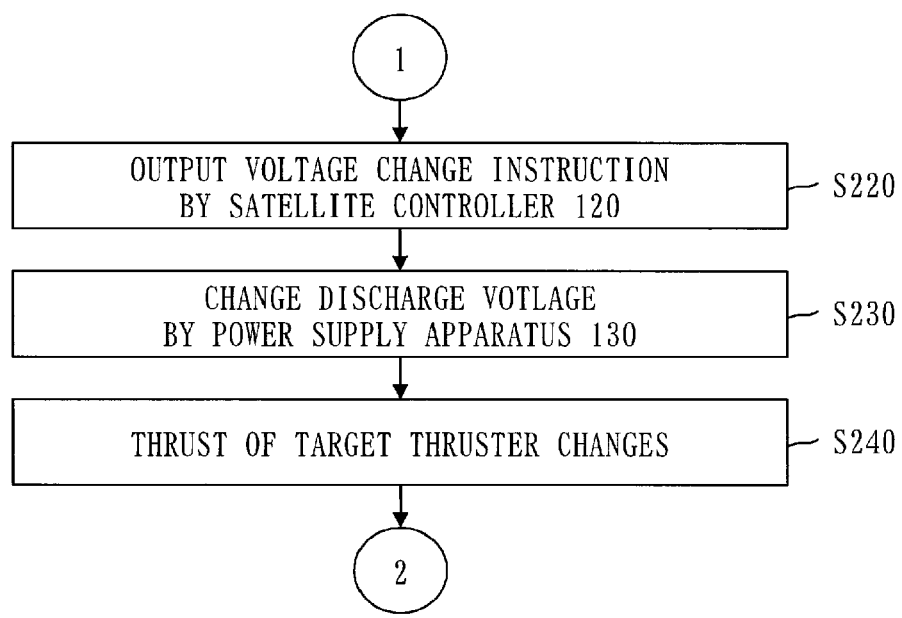
FIG. 17 is a flowchart of the thrust adjustment method in the third embodiment.

If the change type 129 is the voltage change, the procedure proceeds to step S220 in FIG. 17. Processes after step S220 are same as those in FIG. 13 in the second embodiment.

Effects of Third Embodiment

By controlling the discharge current of the target thruster or the discharge voltage of the target thruster, the adjustment of the balance among the thrusts of the plurality of thrusters 150 becomes possible.

As a result, it becomes possible to shorten a time needed for the artificial satellite 100 to be put into a target orbit, as in the first embodiment.

Supplement to the Embodiments

The embodiments are each an illustration of a preferred embodiment and does not intend to limit the technical range of the present invention. Each embodiment may be partially carried out or may be carried out in combination with a different embodiment. Each procedure described using the flowchart or the like may be suitably modified.

REFERENCE SIGNS LIST

100: artificial satellite; 110: reaction wheel; 120: satellite controller; 121: processor; 122: memory; 123: current characteristic data; 124: current value data; 125: current change amount; 126: voltage characteristic data; 127: voltage value data; 128: voltage change amount; 129: change type; 130: power supply apparatus; 140: flow rate adjustment apparatus; 141: tank; 142: pressure adjustment apparatus; 143: valve; 144: flow path; 150: thruster; 190: receiver

The invention claimed is:

1. An artificial satellite comprising:
a plurality of thrusters whose firing directions are the same;
an angular momentum detection apparatus to detect an angular momentum that is generated in the artificial satellite;
a satellite controller to perform adjustment control of selecting, from the plurality of thrusters, a target thruster whose thrust is to be adjusted, based on the detected angular momentum, and adjusting the thrust of the target thruster;
a power supply apparatus to supply adjustment electric power to adjust a flow rate of a propellant that flows through each of the plurality of thrusters and detect a discharge current that flows through each of the plurality of thrusters; and
a flow rate adjustment apparatus to adjust the flow rate of the propellant that flows through each of the plurality of thrusters by the adjustment electric power that is supplied,
wherein the satellite controller outputs a current change instruction to instruct a change in the discharge current that flows through the target thruster, as the adjustment control,
wherein the power supply apparatus changes the adjustment electric power to adjust the flow rate of the propellant that flows through the target thruster when the current change instruction is output,
wherein the flow rate adjustment apparatus flows the propellant through the target thruster at a flow rate corresponding to the adjustment electric power after the change, and
wherein the power supply apparatus detects a discharge current that flows through the target thruster after the current change instruction has been output, and further changes the adjustment electric power for the target thruster when the detected discharge current does not reach a target current,
wherein the satellite controller selects one of the plurality of thrusters whose thrust that is given to the artificial satellite is less than a thrust of any other thruster,
determines whether the thrust of the selected thruster can be increased, based on a discharge current that flows through the selected thruster,
selects the selected thruster as the target thruster when the thrust of the selected thruster can be increased, and
selects a different one of the plurality of thrusters as the target thruster when the thrust of the selected thruster cannot be increased.

2. The artificial satellite according to claim 1,
wherein the current change instruction includes a value of the target current,
wherein the value of the target current is a value different from the discharge current of the target thruster before the current change instruction is output, just by a current change amount,
wherein the artificial satellite comprises a receiver to receive an update instruction to instruct an update of the current change amount, and
wherein the satellite controller updates the current change amount when the update instruction is received.

3. The artificial satellite according to claim 1,
wherein the satellite controller selects one of the plurality of thrusters whose thrust that is given to the artificial satellite is less than a thrust of any other thruster,
determines whether the thrust of the selected thruster can be increased, based on a discharge voltage that is supplied to the selected thruster,
selects the selected thruster as the target thruster when the thrust of the selected thruster can be increased, and
selects a different one of the other thrusters as the target thruster when the thrust of the selected thruster cannot be increased.

4. The artificial satellite according to claim 1, wherein the plurality of thrusters are ion thrusters.

5. The artificial satellite according to claim 1, wherein the flow rate adjustment apparatus flows the propellant through the target thruster at the flow rate corresponding to the adjustment electric power after the change by adjusting an opening degree of a valve controlling the flow rate of the propellant.

6. An artificial satellite comprising:
a plurality of thrusters;
an angular momentum detection apparatus to detect an angular momentum that is generated in the artificial satellite;
a satellite controller to perform adjustment control of selecting, from the plurality of thrusters, a target thruster whose thrust is to be adjusted, based on the detected angular momentum, and adjusting the thrust of the target thruster;
a receiver to receive a type instruction to instruct one of a current change and a voltage change;
a power supply apparatus to supply a discharge voltage to each of the plurality of thrusters, supply adjustment electric power to adjust a flow rate of a propellant that flows through each of the plurality of thrusters, and detect a discharge current that flows through each of the plurality of thrusters; and
a flow rate adjustment apparatus to adjust the flow rate of the propellant that flows through each of the plurality of thrusters by the adjustment electric power that is supplied,
wherein, as the adjustment control, the satellite controller outputs a current change instruction to instruct a change in the discharge current that flows through the target thruster when the type instruction instructs the current change, and outputs a voltage change instruction to instruct a change in the discharge voltage that is supplied to the target thruster when the type instruction instructs the voltage change,
wherein when the current change instruction is output, the power supply apparatus changes the adjustment electric power to adjust the flow rate of the propellant that flows through the target thruster, the flow rate adjustment apparatus flows the propellant through the target thruster at a flow rate corresponding to the adjustment electric power after the change, the power supply apparatus detects a discharge current that flows through the target thruster after the current change instruction has been output, and further changes the adjustment electric power for the target thruster when the detected discharge current does not become a target current, and
wherein when the voltage change instruction is output, the power supply apparatus changes the discharge voltage that is supplied to the target thruster to a target voltage.

7. The artificial satellite according to claim 6,
wherein the current change instruction includes a value of the target current,
wherein the value of the target current is a value different from the discharge current of the target thruster before the current change instruction is output, just by a current change amount,
wherein the voltage change instruction includes a value of the target voltage,
wherein the value of the target voltage is a value different from the discharge voltage of the target thruster before the voltage change instruction is output, just by a voltage change amount,
wherein the artificial satellite comprises a receiver to receive a first update instruction to instruct a change in the current change amount and a second update instruction to instruct a change in the voltage change amount, and
wherein the satellite controller updates the current change amount when the first update instruction is received and updates the voltage change amount when the second update instruction is received.

8. A thrust balance adjustment method comprising:
detecting an angular momentum that is generated in an artificial satellite comprising a plurality of thrusters, by an angular momentum detection apparatus;
performing adjustment control of selecting, from the plurality of thrusters, a target thruster whose thrust is to be adjusted, based on the detected angular momentum and adjusting the thrust of the target thruster, by a satellite controller;
receiving a type instruction to instruct one of a current change and a voltage change, by a receiver;
supplying a discharge voltage to each of the plurality of thrusters, supplying adjustment electric power to adjust a flow rate of a propellant that flows through each of the plurality of thrusters, and detecting a discharge current that flows through each of the plurality of thrusters, by a power supply apparatus; and
adjusting the flow rate of the propellant that flows through each of the plurality of thrusters by the adjustment electric power that is supplied, by a flow rate adjustment apparatus,
wherein, as the adjustment control, the satellite controller outputs a current change instruction to instruct a change in the discharge current that flows through the target thruster when the type instruction instructs the current change, and outputs a voltage change instruction to instruct a change in the discharge voltage that is supplied to the target thruster when the type instruction instructs the voltage change,
wherein when the current change instruction is output, the power supply apparatus changes the adjustment electric power to adjust the flow rate of the propellant that flows through the target thruster, the flow rate adjustment apparatus flows the propellant through the target thruster at a flow rate corresponding to the adjustment electric power after the change, the power supply apparatus detects a discharge current that flows through the target thruster after the current change instruction has been output, and further changes the adjustment electric power for the target thruster when the detected discharge current does not become a target current, and
wherein when the voltage change instruction is output, the power supply apparatus changes the discharge voltage that is supplied to the target thruster to a target voltage.

* * * * *